(12) United States Patent
Shibata et al.

(10) Patent No.: US 10,576,982 B2
(45) Date of Patent: Mar. 3, 2020

(54) VEHICLE CONTROL DEVICE

(71) Applicant: MAZDA MOTOR CORPORATION, Hiroshima (JP)

(72) Inventors: Tetsutaka Shibata, Hiroshima (JP); Masaru Takase, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/085,624

(22) PCT Filed: Aug. 2, 2016

(86) PCT No.: PCT/JP2016/003559
§ 371 (c)(1),
(2) Date: Sep. 17, 2018

(87) PCT Pub. No.: WO2018/025290
PCT Pub. Date: Feb. 8, 2018

(65) Prior Publication Data
US 2019/0084569 A1  Mar. 21, 2019

(51) Int. Cl.
*B60W 30/18* (2012.01)
*B60W 10/18* (2012.01)
(Continued)

(52) U.S. Cl.
CPC .... *B60W 30/18054* (2013.01); *B60W 10/026* (2013.01); *B60W 10/10* (2013.01); *B60W 10/115* (2013.01); *B60W 10/18* (2013.01); *B60W 10/182* (2013.01); *B60W 10/184* (2013.01); *B60W 10/188* (2013.01); *B60W 10/192* (2013.01); *B60W 30/18018* (2013.01); *B60W 30/18118* (2013.01);
(Continued)

(58) Field of Classification Search
None
See application file for complete search history.

(56) References Cited

U.S. PATENT DOCUMENTS

2007/0225117 A1   9/2007   Shimizu et al.
2008/0125944 A1   5/2008   Kamishima et al.
(Continued)

FOREIGN PATENT DOCUMENTS

JP   H09-221010 A   8/1997
JP   2000-205393 A   7/2000
(Continued)

OTHER PUBLICATIONS

International Search Report issued in PCT/JP2016/003559; dated Oct. 25, 2016.

*Primary Examiner* — Justin Holmes
(74) *Attorney, Agent, or Firm* — Studebaker & Brackett PC

(57) ABSTRACT

A vehicle control device (a control unit 100) includes a neutral control unit (100b), a brake hold control unit (100c), and a switching control unit (100d) configured to switch, when a predetermined switching condition is satisfied during execution of brake hold control by the brake hold control unit (100c), application of braking force to at least a drive wheel by execution of the brake hold control to application of the braking force to at least some vehicle wheels by an electric parking brake device. The neutral control unit (100b) stops execution of neutral control upon switching by the switching control unit (100d).

4 Claims, 8 Drawing Sheets

(51) Int. Cl.
*B60W 10/10* (2012.01)
*B60W 10/184* (2012.01)
*B60W 10/02* (2006.01)
*B60W 10/115* (2012.01)
*B60W 10/188* (2012.01)
*B60W 10/192* (2012.01)

(52) U.S. Cl.
CPC ..... *B60W 2540/12* (2013.01); *B60W 2540/16* (2013.01); *B60W 2710/18* (2013.01); *B60W 2710/186* (2013.01)

(56) References Cited

U.S. PATENT DOCUMENTS

2010/0063675 A1* 3/2010 Soma .................... B60L 15/007
701/36
2014/0336892 A1* 11/2014 Braunberger ......... B60W 30/04
701/70
2015/0061365 A1 3/2015 Sakashita et al.
2017/0291585 A1* 10/2017 Kobune .................... B60T 8/00

FOREIGN PATENT DOCUMENTS

| JP | 2005-238960 A | 9/2005 |
| JP | 2005-280640 A | 10/2005 |
| JP | 2008-120151 A | 5/2008 |
| JP | 2008-126933 A | 6/2008 |
| JP | 2009-008242 A | 1/2009 |
| WO | 2015/075526 A1 | 5/2015 |

* cited by examiner

FIG.3

|  | FIRST CLUTCH (18) | SECOND CLUTCH (20) | FIRST BRAKE (70) | SECOND BRAKE (80) | THIRD BRAKE (90) |
|---|---|---|---|---|---|
| NEUTRAL CONTROL | SLIP |  | ○ |  |  |
| FIRST GEAR | ○ |  | ○ |  |  |
| SECOND GEAR | ○ |  |  | ○ |  |
| THIRD GEAR | ○ |  |  |  | ○ |
| FOURTH GEAR | ○ | ○ |  |  |  |
| FIFTH GEAR |  | ○ |  |  | ○ |
| SIXTH GEAR |  | ○ |  | ○ |  |
| REVERSE GEAR |  |  | ○ |  | ○ |

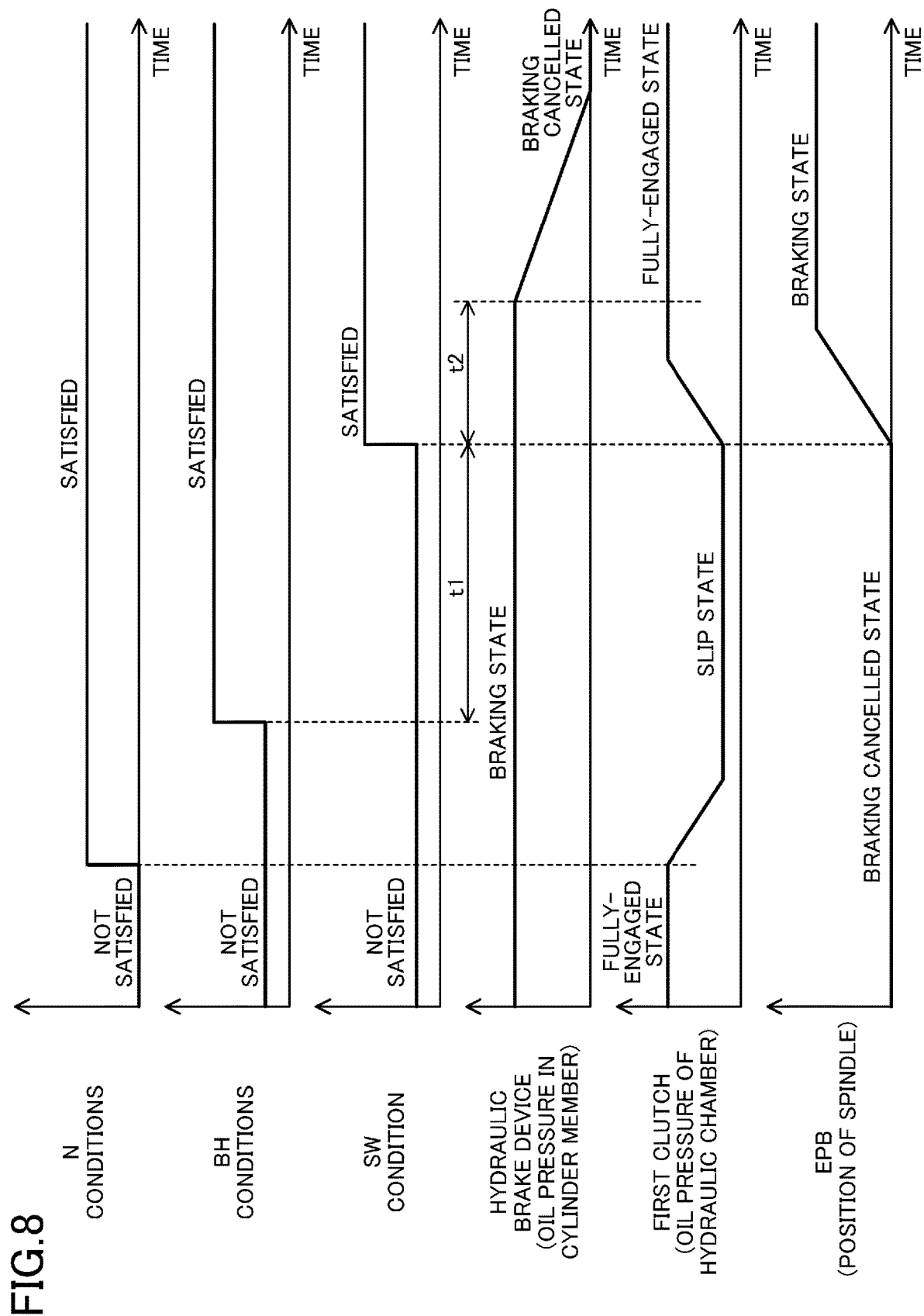

VEHICLE CONTROL DEVICE

TECHNICAL FIELD

The present invention belongs to a technical field regarding a vehicle control device.

BACKGROUND ART

Typically, a vehicle control device has been known, which is configured such that the neutral control of decreasing the degree of engagement of a frictional engagement element engaged upon starting of a vehicle as compared to that in a fully-engaged state and the brake hold control of providing braking force to vehicle wheels regardless of the operation of stepping on a brake pedal by a driver are executed during stop of the vehicle (see, e.g., Patent Document 1).

Moreover, a brake device has been known, which is configured such that a hydraulic brake device and an electric brake device (particularly, an electric parking brake device) are provided at at least one vehicle wheel of a vehicle and braking force applied to the at least one vehicle wheel is controlled by cooperative control of the hydraulic brake device and the electric brake device (see, e.g., Patent Document 2). In this brake device, the effect of reducing heat generation from an electromagnetic control valve configured to supply fluid pressure to the hydraulic brake device as compared to the case of putting a brake on the at least one vehicle wheel only by the hydraulic brake device is obtained.

CITATION LIST

Patent Document

PATENT DOCUMENT 1: Japanese Unexamined Patent Publication No. 2008-126933
PATENT DOCUMENT 2: Japanese Unexamined Patent Publication No. 2005-238960

SUMMARY OF THE INVENTION

Technical Problem

The neutral control and the brake hold control as described above are normally executed when predetermined neutral control conditions and predetermined brake hold control conditions are satisfied during stop of the vehicle. When the neutral control conditions and/or the brake hold control conditions are satisfied during stop of the vehicle, if a request for stating the vehicle is made by the driver of the vehicle (when the driver steps on an accelerator pedal), execution of the neutral control and/or the brake hold control is stopped, and the vehicle is started.

In the brake hold control, the braking force is normally provided to the vehicle wheels (particularly, drive wheels) by the hydraulic brake device. Thus, when at least the brake hold control conditions are satisfied during stop of the vehicle, if no request for starting the vehicle is made by the driver for a long period of time, there is a concern that a braking state (and therefore, a stop state of the vehicle) of the vehicle wheels cannot be reliably held due to a gradual decrease in the fluid pressure supplied to the hydraulic brake device. Pressurization by an electric pump might be performed such that the fluid pressure reaches an original level. However, this increases the amount of energy consumption during stop of the vehicle. Moreover, in a case where no request for starting the vehicle is made by the driver for a long period of time, there is a concern that the electromagnetic control valve of the hydraulic brake device generates heat as described in Patent Document 2.

For these reasons, it may be configured such that vehicle wheel braking by execution of the brake hold control is switched to vehicle wheel control by the electric parking brake device when no request for starting the vehicle is made by the driver for a long period of time during execution of the brake hold control. When the request for starting the vehicle is made by the driver after such switching, the braking force applied to the vehicle wheels by the electric parking brake device is released (the vehicle wheel braking state is cancelled), and the vehicle is started.

When the request for starting the vehicle is made by the driver after switching, if the neutral control is executed, the frictional engagement element needs to be brought into the fully-engaged state not only by cancellation of vehicle wheel braking by the electric parking brake device but also by stop of execution of the neutral control.

The timing of fully cancelling vehicle wheel braking by the electric parking brake device changes due to, e.g., a change in the thickness of a brake pad, and therefore, is unstable. Moreover, the timing of bringing the frictional engagement element into the fully-engaged state is also unstable. For these reasons, when the request for starting the vehicle is made by the driver after switching, if both of the operation of cancelling vehicle wheel braking by the electric parking brake device and the operation of bringing the frictional engagement element into the fully-engaged state are performed to start the vehicle, starting performance of the vehicle might be lowered depending on which operation the completion timing is earlier or later and/or a time lag in the completion timing between both types of operation. For this reason, there is a high probability that a feeling of discomfort is provided to the driver of the vehicle upon starting of the vehicle.

The present invention has been made in view of the above-described points, and is intended to reduce lowering of starting performance of a vehicle as much as possible when a request for staring the vehicle is made by a driver after vehicle wheel braking by execution of brake hold control has been switched to vehicle wheel braking by an electric parking brake device and reduce a feeling of discomfort on the driver of the vehicle upon starting of the vehicle.

Solution to the Problem

For accomplishing the above-described object, the following vehicle control device is provided. A vehicle includes a drive source; an automatic transmission to which torque generated at the drive source is input, the automatic transmission having a frictional engagement element engaged upon starting of the vehicle; a hydraulic brake device provided at each of all vehicle wheels of the vehicle and providing braking force to each vehicle wheel by fluid pressure, the vehicle wheels including a drive wheel to be driven by torque output from the automatic transmission; and an electric parking brake device provided at each of at least some of all vehicle wheels and providing braking force to the at least some of the vehicle wheels by driving of an electric actuator. The vehicle control device includes a neutral control unit executing, when a predetermined neutral control condition including a condition regarding the range position of a shift lever of the vehicle is satisfied during stop of the vehicle, the neutral control of decreasing the degree of engagement of the frictional engagement element as compared to that in a fully-engaged state or bringing the frictional engagement element into a fully-disengaged state; a brake hold control unit executing, when a predetermined brake hold control condition is satisfied during stop of the vehicle, the brake hold control of providing braking force to at least the drive wheel by the hydraulic brake device of the drive wheel even if a driver of the vehicle does not step on a brake pedal; and a switching control unit switching, when a predetermined switching condition is satisfied during execution of the brake hold control by the brake hold control unit, application of the braking force to at least the drive wheel by execution of the brake hold control to application of the braking force to the at least some of the vehicle wheels by the electric parking brake device. When the predetermined switching condition is satisfied during execution of the brake hold control by the brake hold control unit, if the neutral control is being executed, the neutral control unit is configured to stop execution of the neutral control upon switching by the switching control unit.

With the above-described configuration, the neutral control unit stops execution of the neutral control upon switching by the switching control unit. Thus, when a request for starting the vehicle is made by the driver after switching, the frictional engagement element has been already brought into the fully-engaged state. Accordingly, when the request for starting the vehicle is made by the driver after switching, only vehicle wheel braking by the electric parking brake device may be cancelled. Thus, lowering of starting performance of the vehicle due to overlapping of both types of the operation of cancelling vehicle wheel braking by the electric parking brake device and the operation of bringing the frictional engagement element into the fully-engaged state can be suppressed. Thus, when the request for starting the vehicle is made by the driver after switching by the switching control unit, a feeling of discomfort on the driver of the vehicle upon starting of the vehicle can be reduced.

Preferably, in the above-described vehicle control device, the switching control unit is configured to start actuation of the electric actuator when the predetermined switching condition is satisfied during execution of the brake hold control by the brake hold control unit, and causes the brake hold control unit to stop execution of the brake hold control when a predetermined time is elapsed after the start of actuation of the electric actuator, and the neutral control unit is configured to stop execution of the neutral control such that the frictional engagement element is brought into the fully-engaged state before execution of the brake hold control is stopped if the neutral control is being executed when the predetermined switching condition is satisfied during execution of the brake hold control by the brake hold control unit.

With this configuration, the predetermined time is set to a time until application of the braking force for holding a stop state of the vehicle to at least some vehicle wheels by the electric actuator is completed after the start of actuation of the electric actuator, and therefore, switching by the switching control unit can be smoothly performed with the stop state of the vehicle being held. Moreover, the frictional engagement element is brought into the fully-engaged state before execution of the brake hold control is stopped. Thus, even when great torque from the automatic transmission acts on the drive wheel because of the frictional engagement element in the fully-engaged state, the stop state of the vehicle can be held by execution of the brake hold control. Further, execution of the brake hold control is stopped after application of the braking force by the electric actuator has been completed and the frictional engagement element has transitioned to the fully-engaged state. Thus, fluid pressure supplied to each vehicle wheel can be gradually decreased, and as a result, the feeling of discomfort on the driver due to a vehicle state change in association with switching by the switching control unit and stop of execution of the neutral control can be reduced.

In one embodiment having the above-described preferable configuration, the brake hold control unit is configured to hold the stop state of the vehicle by the hydraulic brake devices of all vehicle wheels of the vehicle, and the electric parking brake device is provided at each of the some vehicle wheels of the vehicle to provide the braking force to the some vehicle wheels.

With this configuration, the vehicle state change more easily occurs due to switching by the switching control unit and stop of execution of the neutral control. However, execution of the brake hold control is stopped after application of the braking force by the electric actuator has been completed and the frictional engagement element has transitioned to the fully-engaged state. Thus, the feeling of discomfort on the driver due to the state change can be reduced.

In a specific example of one embodiment described above, the drive wheel is a front wheel, and the electric parking brake device is provided at each of right and left rear wheels of the vehicle to provide the braking force to the each of the right and left rear wheels.

In a case where the drive wheel is the front wheel as described above, when the frictional engagement element is brought into the fully-engaged state and great torque from the automatic transmission acts on the front wheel, a coil spring of a suspension of the front wheel tends to be extended by such torque. Thus, a front side of the vehicle receives lifting force from the coil spring. Due to such force, a coil spring of a suspension of a rear wheel tends to be contracted, and as a result, the front side of the vehicle is further lifted. When the torque acts on the front wheel as described above, if no braking force is provided to the front wheel, lifting of the front side of the vehicle is noticeable. However, when the torque acts on the front wheel, if the braking force is provided to the front wheel, lifting of the front side of the vehicle can be suppressed. Thus, execution of the brake hold control is stopped after the frictional engagement element has been brought into the fully-engaged state, and therefore, lifting of the front side of the vehicle can be reduced as much as possible. Accordingly, a state change such as lifting of the front side of the vehicle can be reduced, and the feeling of discomfort on the driver due to such a state change can be reduced.

Advantages of the Invention

As described above, according to the vehicle control device of the present invention, when the predetermined switching condition is satisfied during execution of the brake hold control by the brake hold control unit, if the neutral control is being executed, the neutral control unit stops execution of the neutral control upon switching by the switching control unit. Thus, the feeling of discomfort on the driver of the vehicle can be reduced upon starting of the vehicle when the request for starting the vehicle is made by the driver after switching by the switching control unit.

BRIEF DESCRIPTION OF THE DRAWINGS

FIG. 3 is a table showing a relationship between a combination of engagement of frictional engagement elements of the automatic transmission and a gear stage.

FIG. 8 is a timing chart showing operation of the hydraulic brake device, a first clutch, and the electric parking brake device in a case where predetermined neutral control conditions, predetermined brake hold control conditions, and a predetermined switching condition are satisfied during stop of the vehicle.

DESCRIPTION OF EMBODIMENTS

Hereinafter, an exemplary embodiment will be described in detail with reference to the drawings.

Figure 1:
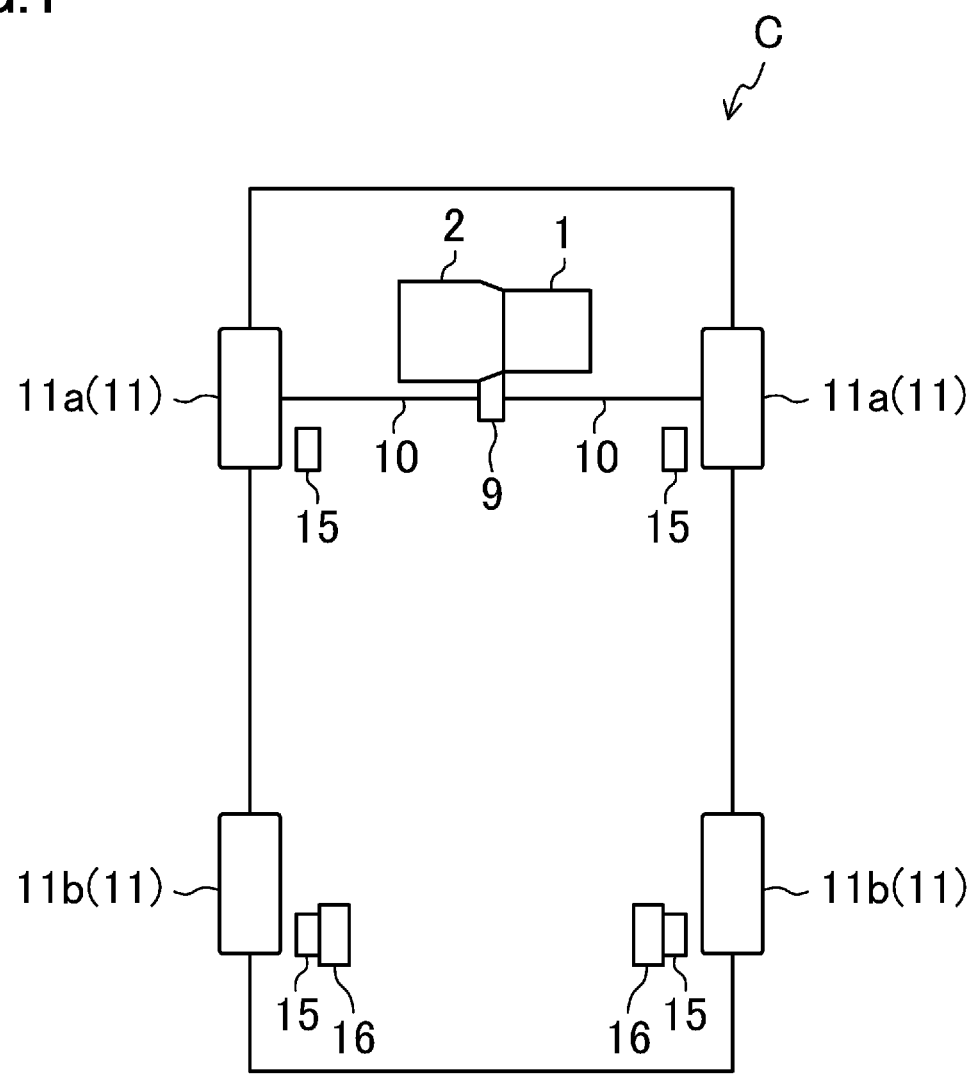
FIG. 1 is a schematic diagram of a vehicle equipped with a control device according to an exemplary embodiment.

FIG. 1 illustrates a vehicle C (in the present embodiment, an automobile) equipped with a control device (a later-described control unit 100) according to the exemplary embodiment. The vehicle C has an engine 1 as a drive source, and an automatic transmission 2 to which torque generated at the engine 1 is input. The engine 1 and the automatic transmission 2 are mounted in an engine room positioned at a front portion of the vehicle C. An output shaft 1a of the engine 1 is coupled to an input shaft 4 of the automatic transmission 2 via a torque converter 3 (see FIG. 2). In the present embodiment, the output shaft 1a of the engine 1 and the input shaft 4 of the automatic transmission 2 extend in a vehicle width direction. Note that the drive source is not limited to the engine 1, but may be an electric motor etc.

Figure 2:
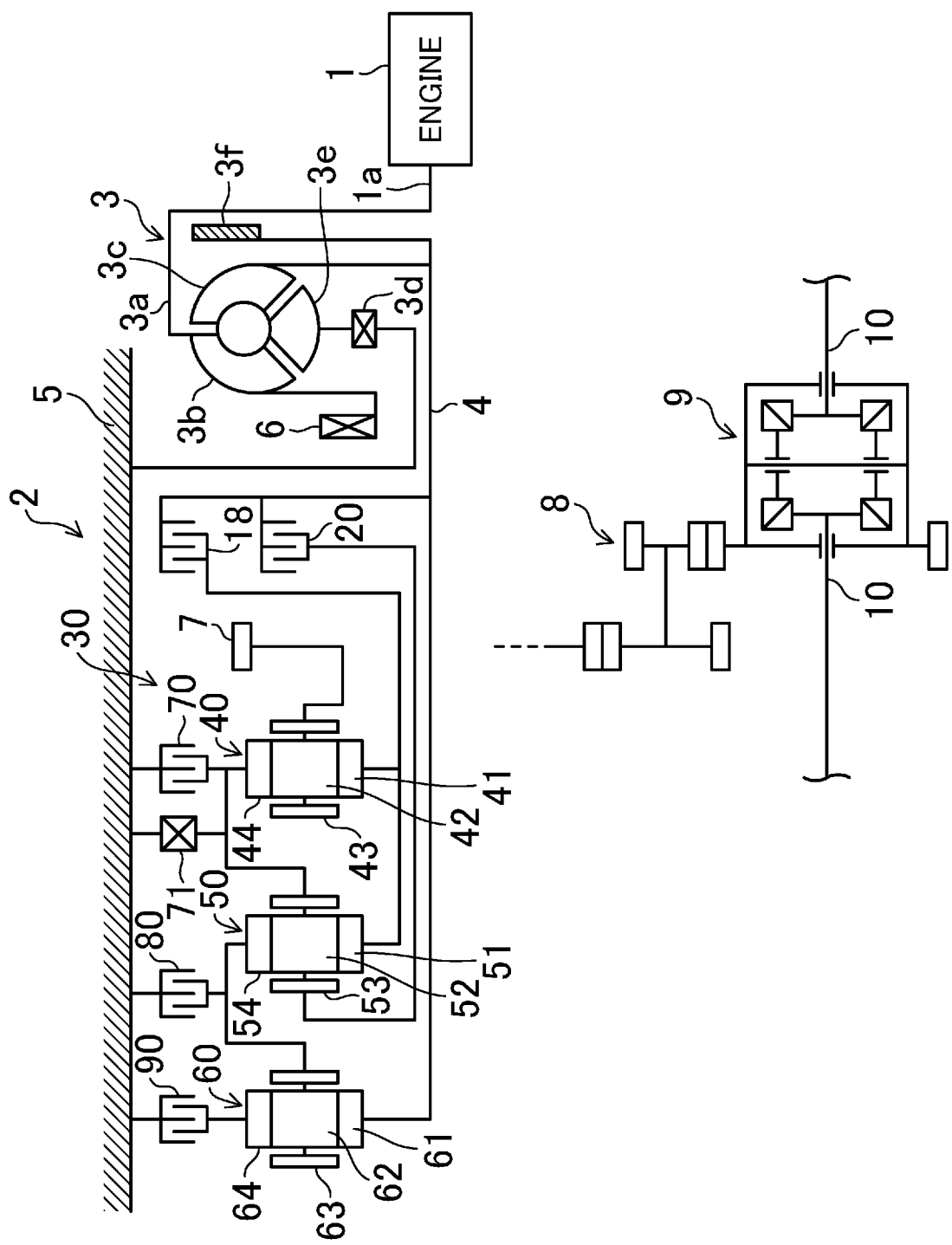
FIG. 2 is a skeleton diagram of an automatic transmission mounted on the vehicle.

As illustrated in FIG. 2, the automatic transmission 2 has a transmission mechanism 30 to which power (torque) is input from the torque converter 3 via the input shaft 4. The transmission mechanism 30 is, together with the torque converter 3, housed in a transmission case 5. A mechanical oil pump 6 to be driven by the engine 1 via the torque converter 3 is arranged between the torque converter 3 and the transmission mechanism 30. The oil pump 6 is provided as an oil supply source configured to supply oil necessary for the automatic transmission 2 (particularly, hydraulic chambers of a first clutch 18, a second clutch 20, a first brake 70, a second brake 80, and a third brake 90 in the transmission mechanism 30 as described later) and the torque converter 3.

An output gear 7 configured to take out power from the transmission mechanism 30 (the automatic transmission 2) is arranged coaxial with the input shaft 4 in the transmission mechanism 30. Power (torque) from the output gear 7 of the transmission mechanism 30 is transmitted to a differential device 9 via a counter drive mechanism 8, and the transmitted power (torque) drives each of right and left front wheels 11a (see FIG. 1) via right and left drive shafts 10. As described above, the front wheel 11a is a drive wheel to be driven by the torque output from the automatic transmission 2. Thus, in the present embodiment, the vehicle C is an FF vehicle.

At each of all vehicle wheels 11 (the front wheels 11a and rear wheels 11b) of the vehicle C, a hydraulic brake device 15 configured to provide braking force to the vehicle wheel 11 by fluid pressure (in the present embodiment, oil pressure) is provided. These hydraulic brake devices 15 are actuated in such a manner that the oil pressure is supplied by actuation of a brake hydraulic control valve 121 (see FIG. 5), and put a brake on each vehicle wheel 11. Note that upon later-described brake hold control, an electric pump 123 (see FIG. 5) is actuated in addition to actuation of the brake hydraulic control valve 121, and in this manner, the same level of oil pressure as that when a brake pedal is stepped on can be supplied to each vehicle wheel 11.

The torque converter 3 includes a case 3a coupled to the output shaft 1a of the engine 1, a pump 3b fixed in the case 3a, a turbine 3c arranged facing the pump 3b and driven by the pump 3b via hydraulic oil, a stator 3e interposed between the pump 3b and the turbine 3c and supported by the transmission case 5 via a one-way clutch 3d to perform torque increasing activity, and a lock-up clutch 3f directly coupled to the output shaft 1a of the engine 1 and the turbine 3c via the case 3a. Rotation of the turbine 3c is transmitted to the transmission mechanism 30 via the input shaft 4.

The transmission mechanism 30 has, as frictional engagement elements, the first clutch 18, the second clutch 20, the first brake 70, the second brake 80, and the third brake 90. Hereinafter, when it is not necessary to distinguish these elements from each other, these elements will be referred to as "frictional engagement elements." Each frictional engagement element is engaged or disengaged by oil supply to the hydraulic chamber of each frictional engagement element or oil discharge from the hydraulic chamber of each frictional engagement element.

In the transmission case 5, the first clutch 18 and the second clutch 20 are arranged in a radial direction of the input shaft 4 on a side closer to the torque converter 3 with respect to the output gear 7, and the first brake 70, the second brake 80, and the third brake 90 are arranged in this order from the torque converter 3 on a side opposite to the torque converter 3 with respect to the output gear 7. Moreover, a one-way clutch 71 is arranged in parallel with the first brake 70.

The transmission mechanism 30 further has first, second, and third planetary gear sets 40, 50, 60. The first, second, and third planetary gear sets 40, 50, 60 are arranged in this order from the torque converter 3 on the side opposite to the torque converter 3 with respect to the output gear 7 in the transmission case 5.

Any of the first, second, and third planetary gear sets 40, 50, 60 is a single-pinion planetary gear set. Each of the first, second, and third planetary gear sets 40, 50, 60 includes a sun gear 41, 51, 61, pinions 42, 52, 62 (multiple pinions are provided at each planetary gear set) engaging with the sun gear 41, 51, 61, a carrier 43, 53, 63 supporting each pinion 42, 52, 62, and a ring gear 44, 54, 64 engaging with each pinion 42, 52, 62.

The input shaft 4 is coupled to the sun gear 61 of the third planetary gear set 60. Moreover, the sun gear 41 of the first planetary gear set 40 and the sun gear 51 of the second planetary gear set 50 are coupled to each other, the ring gear 44 of the first planetary gear set 40 and the carrier 53 of the second planetary gear set 50 are coupled to each other, and the ring gear 54 of the second planetary gear set 50 and the carrier 63 of the third planetary gear set 60 are coupled to each other. The output gear 7 is coupled to the carrier 43 of the first planetary gear set 40.

The first clutch 18 is configured to disconnect or connect between the input shaft 4 and each of the sun gear 41 of the first planetary gear set 40 and the sun gear 51 of the second planetary gear set 50, and the second clutch 20 is configured to disconnect or connect between the input shaft 4 and each of the ring gear 44 of the first planetary gear set 40 and the carrier 53 of the second planetary gear set 50.

The one-way clutch 71 is arranged in parallel with the first brake 70 between the transmission case 5 and each of the ring gear 44 of the first planetary gear set 40 and the carrier 53 of the second planetary gear set 50. Even when the first brake 70 is not engaged, if the first clutch 18 is engaged, the one-way clutch 71 performs locking to realize a first gear. However, in the present embodiment, the first brake 70 is, together with the first clutch 18, engaged at the first gear (see a table of FIG. 3).

The automatic transmission 2 is for realizing six forward gears and one reverse gear by a combination of engagement states of the frictional engagement elements. It is configured such that engagement and disengagement of each frictional engagement element (oil supply to the hydraulic chamber and oil discharge from the hydraulic chamber) are controlled by actuation of an AT hydraulic control valve 122 (see FIG. 5) provided at a hydraulic control circuit including the oil pump 6.

FIG. 3 is the table showing a relationship between the combination of engagement of the frictional engagement elements of the automatic transmission 2 and a gear stage. A white circle mark indicates that engagement is made, and a blank indicates that disengagement is made. Moreover, this table also shows a state during execution of later-described neutral control.

At each of the right and left rear wheels 11b of the vehicle C, an electric parking brake device 16 configured to provide braking force to each rear wheel 11b by driving of an electric motor 124 (see FIG. 5) as an electric actuator is provided. Each electric parking brake device 16 is assembled with the hydraulic brake device 15 of each rear wheel 11b.

Figure 4:
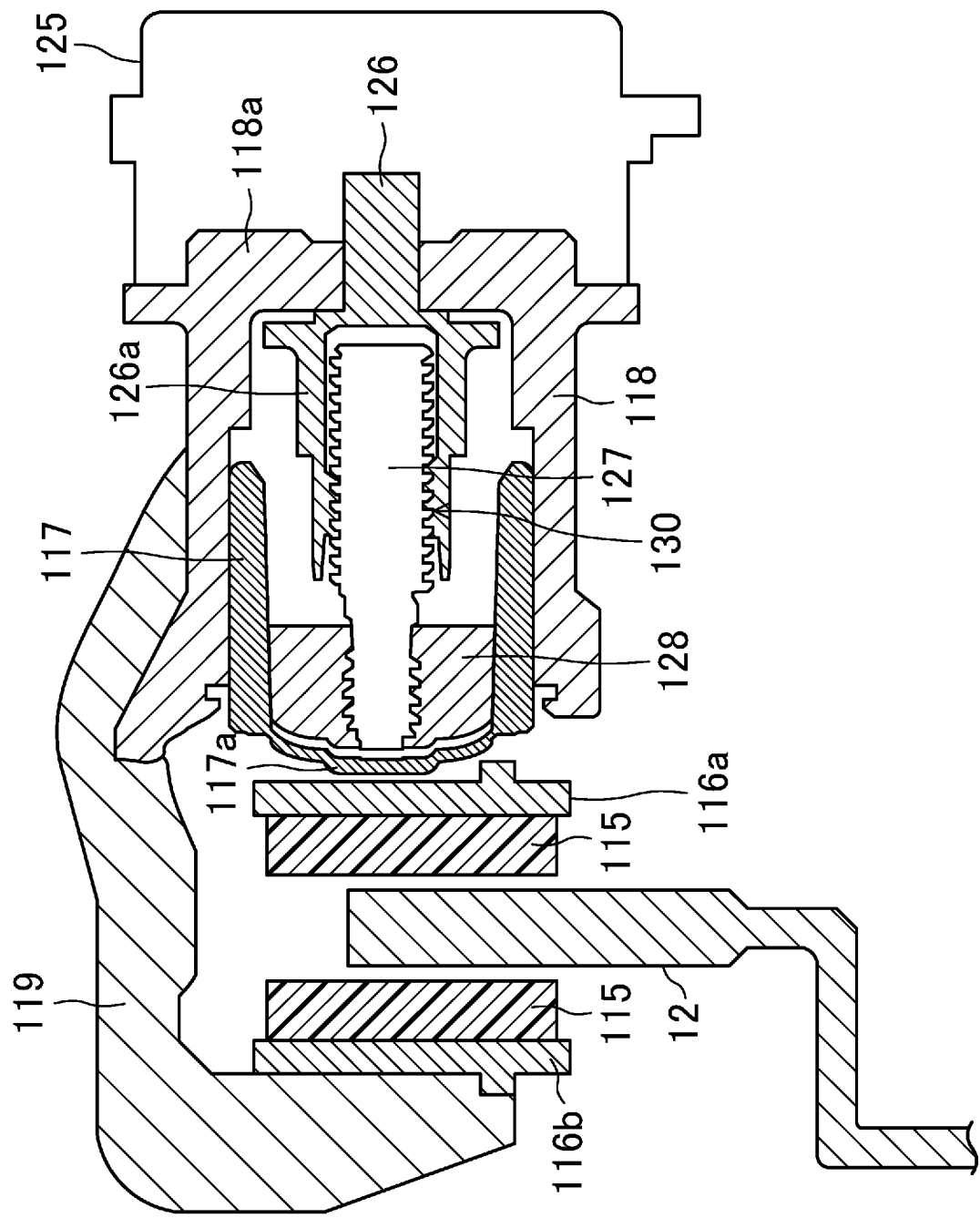
FIG. 4 is a sectional view of a hydraulic brake device and an electric parking brake device of a rear wheel.

The hydraulic brake device 15 of each rear wheel 11b has a well-known configuration, and as illustrated in FIG. 4, includes two brake pads 115 each arranged on both sides of a disk plate 12 of the rear wheel 11b. One brake pad 115 (the right brake pad 115 in FIG. 4) is supported by a first support plate 116a, and the other brake pad 115 (the left brake pad 115 in FIG. 4) is supported by a second support plate 116b. A bottom portion 117a of a brake piston 117 in a tubular shape with a bottom is positioned facing the first support plate 116a. The brake piston 117 is inserted into an opening-side portion of a cylinder member 118 in a tubular shape with a bottom. The cylinder member 118 is coupled to the second support plate 116b via a caliper 119. Oil (oil pressure) is supplied to a space between a bottom portion 118a and the brake piston 117 in the cylinder member 118 by the brake hydraulic control valve 121. By such oil supply, the brake piston 117 presses the first support plate 116a toward the disk plate 12, and accordingly, the brake pad 115 supported by the first support plate 116a is pressed against the disk plate 12. Moreover, by oil supply as described above, the bottom portion 118a of the cylinder member 118 is pressed toward the opposite side of the brake piston 117. Accordingly, the second support plate 116b moves toward the disk plate 12, and the brake pad 115 supported by the second support plate 116b is pressed against the disk plate 12. This puts a brake on the rear wheel 11b. Note that the hydraulic brake device 15 of the front wheel 11a also has a configuration similar to that of the hydraulic brake device 15 of the rear wheel 11b. Note that the electric parking brake device 16 is not assembled with the hydraulic brake device 15 of the front wheel 11a, and therefore, e.g., the shapes of the brake piston 117 and the cylinder member 118 are different accordingly.

Each electric parking brake device 16 has a motor unit 125 with the electric motor 124. The motor unit 125 includes a deceleration mechanism (not shown) configured to decelerate rotation of the electric motor 124, and an output shaft 126 as an output of the deceleration mechanism. The output shaft 126 is configured to rotate about the center axis of the output shaft 126. The motor unit 125 is attached and fixed to an outer surface of the bottom portion 118a of the cylinder member 118. The output shaft 126 penetrates the bottom portion 118a of the cylinder member 118 to enter the cylinder member 118. Of the output shaft 126, a portion positioned in the cylinder member 118 is a hollow shaft portion 126a extending coaxial with the cylinder member 118. A spindle 127 is inserted into the hollow shaft portion 126a.

An inner peripheral surface of the hollow shaft portion 126a and an outer peripheral surface of the spindle 127 form a feed screw mechanism 130. By the feed screw mechanism 130, rotation of the hollow shaft portion 126a (the output shaft 126) is converted into linear movement in an axial direction of the spindle 127. The spindle 127 enters the brake piston 117 through an opening-side end portion thereof, and extends coaxial with the output shaft 126 and the brake piston 117 until reaching the vicinity of the bottom portion 117a of the brake piston 117. A pressing member 128 is fixed to a tip end portion of the spindle 127. Upon linear movement of the spindle 127, the pressing member 128 moves relative to the brake piston 117 in an axial direction of the brake piston 117.

When the electric motor 124 is driven to rotate forward to rotate the output shaft 126 of the motor unit 125, the spindle 127 linearly moves toward the bottom portion 117a of the brake piston 117 by the feed screw mechanism 130. Accordingly, the pressing member 128 presses the bottom portion 117a of the brake piston 117 toward the first support plate 116a. As a result, the brake piston 117 presses, as in the hydraulic brake device 15, the first support plate 116a toward the disk plate 12, and the brake pad 115 supported by the first support plate 116a is pressed against the disk plate 12. Moreover, when the spindle 127 linearly moves toward the bottom portion 117a of the brake piston 117, the output shaft 126 is, in response to reactive force from the spindle 127, pressed to the opposite side of the pressing member 128. By the output shaft 126, the bottom portion 118a of the cylinder member 118 is pressed to the opposite side of the brake piston 117. As a result, the second support plate 116b moves, as in the hydraulic brake device 15, toward the disk plate 12, and the brake pad 115 supported by the second support plate 116b is pressed against the disk plate 12.

When a preset first set time is elapsed after the start of forward rotation of the electric motor 124, the electric motor 124 is stopped. The first set time is set to a time until the brake pad 115 is pressed against the disk plate 12 with proper force regardless of the amount of friction of the brake pad 115 after the start of forward rotation of the electric motor 124. Even when the electric motor 124 is stopped, the output shaft 126 of the motor unit 125 cannot be rotated from a side close to the spindle 127 via the feed screw mechanism 130. As a result, even when the electric motor 124 is stopped, a stop state of the vehicle C is held. The electric parking brake device 16 provide, as described above, the braking force to each rear wheel 11b to hold a braking state of the rear wheel 11b.

When braking of the rear wheel 11b by the electric parking brake device 16 is cancelled, the electric motor 124 is driven to rotate backward. In this manner, the spindle 127 and the pressing member 128 move to the side opposite to that upon braking operation described above. Accordingly, pressing of the brake piston 117 by the pressing member 128 is cancelled, and pressing of the bottom portion 118a of the cylinder member 118 by the output shaft 126 is cancelled. Thus, braking of the rear wheel 11b is cancelled. The electric motor 124 is stopped when a preset second set time is elapsed after the start of backward rotation of the electric motor 124. The second set time is set to a time until cancelation of braking of the rear wheel 11b is reliably performed regardless of the amount of friction of the brake pad 115 after the start of backward rotation of the electric motor 124.

Figure 5:
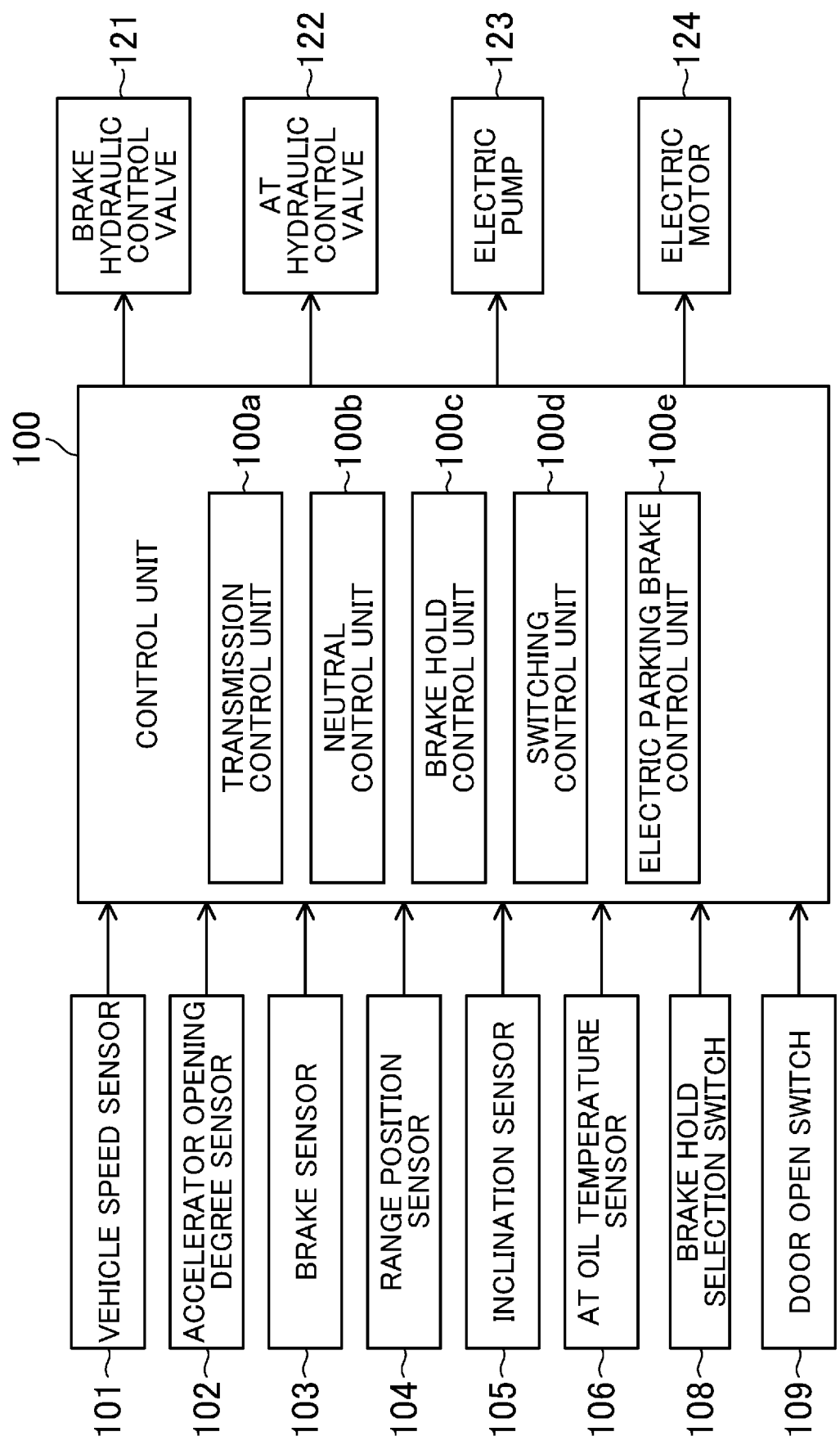
FIG. 5 is a block diagram of a configuration of the control device.

As illustrated in FIG. 5, the vehicle C includes a control unit 100 configured to control actuation of the brake hydraulic control valve 121, the AT hydraulic control valve 122, the electric pump 123, and the electric motor 124. The control unit 100 is a controller based on a well-known microcomputer. The control unit 100 includes a central processing unit (CPU) configured to execute a program, a memory including a RAM, a ROM, etc. and configured to store a program and data, and an input/output (I/O) bus configured to input/output an electric signal.

The following signals are input to the control unit 100: a signal from a vehicle speed sensor 101 configured to detect the vehicle speed of the vehicle C; a signal from an accelerator opening degree sensor 102 configured to detect the amount (an accelerator opening degree) of stepping on an accelerator pedal of the vehicle C; a signal from a brake sensor 103 configured to detect the amount of stepping on the brake pedal of the vehicle C; a signal from a range position sensor 104 configured to detect the range position of a shift lever of the vehicle C; a signal from an inclination sensor 105 configured to detect inclination of a travelling path on which the vehicle C is travelling; a signal from an AT oil temperature sensor 106 configured to detect the temperature of oil flowing in the hydraulic control circuit; a signal from a brake hold selection switch 108 operable by a driver of the vehicle C to select whether or not execution of later-described brake hold control is permitted; and a signal from a door open switch 109 configured to detect that a door corresponding to a driver's seat of the vehicle C is opened. Note that in the present embodiment, the inclination (%) of the travelling path obtained by the inclination sensor 105 is a negative value for a descending slope, and is a positive value for an ascending slope.

Based on the above-described input signals, the control unit 100 controls actuation of the brake hydraulic control valve 121, the AT hydraulic control valve 122, the electric pump 123, and the electric motor 124.

In the control unit 100, a transmission control unit 100a, a neutral control unit 100b, a brake hold control unit 100c, a switching control unit 100d, and an electric parking brake control unit 100e configured to control actuation of the electric parking brake devices 16 (the electric motor 124) are provided.

The transmission control unit 100a is configured to determine, when the range position of the shift lever obtained by the range position sensor 104 is a D-range position, the gear stage from a travelling state (specifically, the signal from the vehicle speed sensor 101 and the signal from the accelerator opening degree sensor 102) of the vehicle C by means of a transmission map stored in advance in the memory of the control unit 100, thereby controlling the AT hydraulic control valve 122 such that the gear stage of the automatic transmission 2 is changed to the determined gear stage. Moreover, when the range position of the shift lever obtained by the range position sensor 104 is an R-range position, the transmission control unit 100a controls the AT hydraulic control valve 122 such that the gear stage of the automatic transmission 2 is changed to the reverse gear. Further, when the range position of the shift lever obtained by the range position sensor 104 is an N-range position, the transmission control unit 100a controls the AT hydraulic control valve 122 such that all of the frictional engagement elements are brought into a disengaged state.

The neutral control unit 100b is configured to execute, when predetermined neutral control conditions including a condition regarding the range position of the shift lever are satisfied during stop (when the vehicle speed detected by the vehicle speed sensor 101 is zero) of the vehicle C, the neutral control of decreasing the degree of engagement of the frictional engagement element (in the present embodiment, the first clutch 18) engaged upon starting of the vehicle C as compared to that in a fully-engaged state (i.e., slipping multiple friction plates of the first clutch 18 on each other). In the neutral control, the frictional engagement element engaged upon starting of the vehicle C may be in a fully-disengaged state. Note that the multiple friction plates of the frictional engagement element engaged upon starting of the vehicle C are preferably slipped on each other, considering smooth starting of the vehicle C.

In the present embodiment, the predetermined neutral control conditions are the following conditions: the range position of the shift lever obtained by the range position sensor 104 is the D-range position; an absolute value of the inclination of the travelling path obtained by the inclination sensor 105 is less than a predetermined inclination (e.g., 5%); and the oil temperature obtained by the AT oil temperature sensor 106 is equal to or higher than a predetermined temperature (the minimum temperature (e.g., 40° C.) in a warm state of the automatic transmission 2). In the present embodiment, the condition regarding the range position of the shift lever is the condition where the range position of the shift lever is the D-range position. Instead, the condition may be a condition where the range position of the shift lever is any one of the travelling range positions. These traveling range positions include a forward travelling range position (the D-range position) and a reverse travelling range position (the R-range position). In a case where the forward travelling range position includes other range positions (e.g., a M-range position at which the gear stage of the automatic transmission 2 can be manually switched by operation of the driver of the vehicle C) than the D-range position, there other range positions may be included in the forward travelling range position. In a case where the neutral control is performed when the range position of the shift lever is the forward travelling range position, the frictional engagement element engaged upon starting of the vehicle C is the frictional engagement element engaged upon forward starting. In a case where the neutral control is performed when the range position of the shift lever is the R-range position, the frictional engagement element engaged upon starting of the vehicle C is the frictional engagement element (in the present embodiment, the first brake 70 and/or the third brake 90) engaged upon reverse starting.

The neutral control unit 100b is configured to stop execution of the neutral control (bring the first clutch 18 into the fully-engaged state) when a request for starting the vehicle C is made by the driver of the vehicle C during execution of the neutral control (in the present embodiment, when the accelerator pedal is stepped on by the driver).

The brake hold control unit 100c is configured to execute, when predetermined brake hold control conditions are satisfied during stop of the vehicle C, the brake hold control of providing the braking force to all of the vehicle wheels 11 by the hydraulic brake devices 15 of all of the vehicle wheels 11 of the vehicle C even if the driver of the vehicle C does not step on the brake pedal. Note that the vehicle wheels to which the braking force is provided upon execution of the brake hold control may be only the drive wheels (in the present embodiment, the front wheels 11a).

In the present embodiment, the predetermined brake hold control conditions are the following conditions: the brake hold selection switch 108 is ON (the driver of the vehicle C permits execution of the brake hold control); and the driver releases the brake pedal stepped during stop of the vehicle C (more specifically, the amount of stepping on the brake pedal reaches equal to or less than a predetermined amount). The predetermined brake hold control conditions may be the following conditions: the brake hold selection switch 108 is ON; the driver releases the brake pedal stepped during stop of the vehicle C; and the range position of the shift lever is the travelling range position (i.e., the range position at which the vehicle C might be moved by creep torque of the automatic transmission 2).

The brake hold control unit 100c is configured to stop execution of the brake hold control (cancel braking of all of the vehicle wheels 11) when a request for starting the vehicle C is made by the driver of the vehicle C during execution of the brake hold control (when the driver steps on the accelerator pedal).

The switching control unit 100d is configured to switch, when a predetermined switching condition is satisfied in a state in which no request for starting the vehicle C is made by the driver of the vehicle C during execution of the brake hold control by the brake hold control unit 100c, application of the braking force to all of the vehicle wheels 11 by execution of the brake hold control to application of the braking force to the rear wheels 11b by the electric parking brake devices 16.

In the present embodiment, the predetermined switching condition is a condition where one of the following conditions is satisfied: a first predetermined time t1 is elapsed after the start of execution of the brake hold control; and opening of the door corresponding to the driver's seat is detected by the door open switch 109 even before the first predetermined time t1 is elapsed. Note that the predetermined switching condition may be a condition where the first predetermined time t1 is elapsed after the start of execution of the brake hold control.

The first predetermined time t1 is such a time that the braking state of the vehicle wheel 11 (and therefore, the stop state of the vehicle C) cannot be reliably held due to lowering of the oil pressure supplied to the hydraulic brake device 15 in a case where the brake hold control is executed beyond the first predetermined time t1 and that the brake hydraulic control valve 121 generates great heat. The first predetermined time t1 is set to several minutes to several tens of minutes, for example.

It is assumed that in a case where the door is opened, there is a high probability that the driver of the vehicle C temporarily gets out of the vehicle C and that a stop time of the vehicle C is long. For this reason, even when the condition where opening of the door is detected, the switching control unit 100d executes switching as described above.

When the predetermined switching condition is satisfied during execution of the brake hold control by the brake hold control unit 100c, if the neutral control is being executed, the neutral control unit 100b is configured to stop execution of the neutral control upon switching by the switching control unit 100d even when no request for starting the vehicle C is made by the driver of the vehicle C.

The electric parking brake control unit 100e is configured to receive a command from the switching control unit 100d upon switching by the switching control unit 100d to cause the electric parking brake devices 16 to put a brake on the rear wheels 11b, and is configured to cancel braking of the rear wheels 11b by the electric parking brake devices 16 when the request for starting the vehicle C is made by the driver after switching. As described above, when the request for starting the vehicle C is made by the driver after switching, execution of the neutral control has been already stopped, and therefore, only the operation of cancelling braking of the rear wheels 11b by the electric parking brake devices 16 may be performed without the need for the operation of stopping execution of the neutral control.

Switching by the switching control unit 100d as described above is performed such that braking of all of the vehicle wheels 11 by execution of the brake hold control and braking of the rear wheels 11b by the electric parking brake devices 16 overlap with each other.

Specifically, the switching control unit 100d causes the electric parking brake control unit 100e to start actuation of the electric motor 124 when the predetermined switching condition is satisfied during execution of the brake hold control by the brake hold control unit 100c, and causes the brake hold control unit 100c to stop execution of the brake hold control when a second predetermined time t2 is elapsed after the start of actuation of the electric motor 124. The second predetermined time t2 is set to a time similar to the first set time. That is, the second predetermined time t2 is a time (e.g., 500 ms to 1 s) until application of the braking force for holding the stop state of the vehicle C to the rear wheels 11b by the electric motor 124 is completed after the start of actuation of the electric motor 124.

When the predetermined switching condition is satisfied during execution of the brake hold control by the brake hold control unit 100c, if the neutral control is being executed, the neutral control unit 100b stops execution of the neutral control such that the first clutch 18 is brought into the fully-engaged state before execution of the brake hold control is stopped. In the present embodiment, the neutral control unit 100b stops execution of the neutral control at the substantially same time as the start of actuation of the electric motor 124. Thus, the oil pressure supplied to the first clutch 18 starts increasing at the substantially same time as the start of actuation of the electric motor 124, and the first clutch 18 is brought into the fully-engaged state before execution of the brake hold control is stopped.

Figure 6:
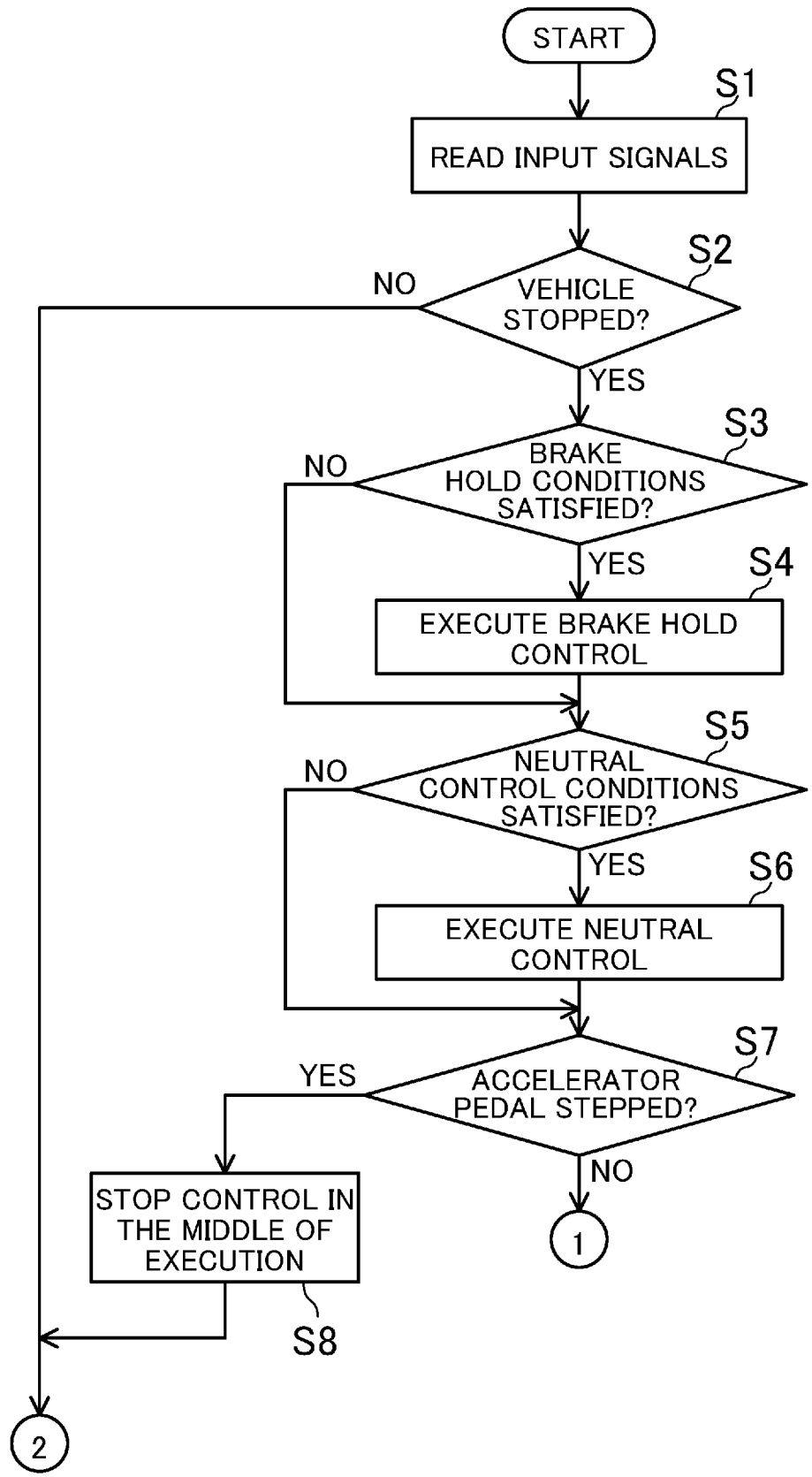
FIG. 6 is a flowchart of part of control operation by a control unit.
Figure 7:
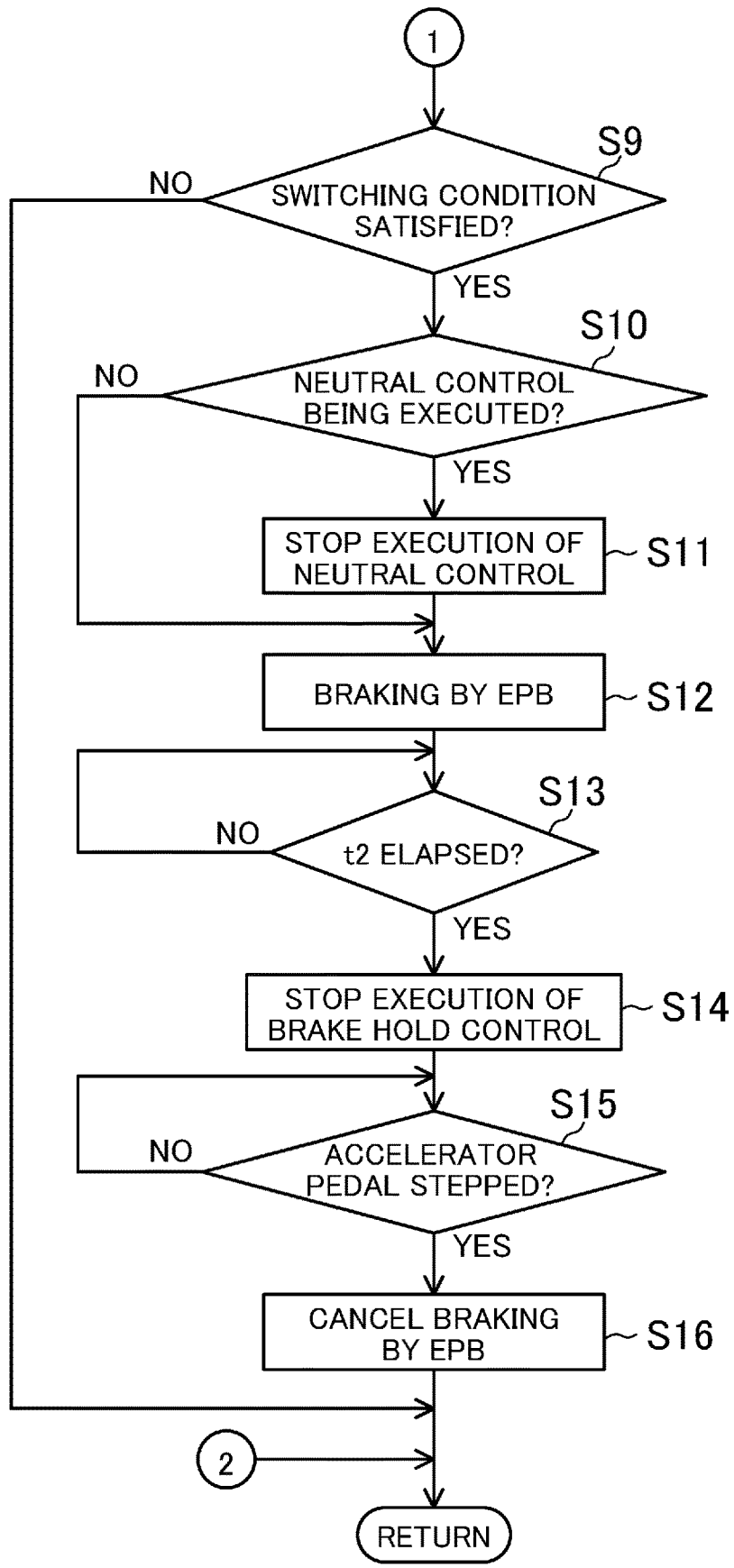
FIG. 7 is a flowchart of the remaining part of the control operation by the control unit.

Control operation by the control unit 100 will be described herein with reference to flowcharts of FIGS. 6 and 7.

At an initial step S1, the input signals from various sensors and switches are read. At a subsequent step S2, it is determined whether or not the vehicle is stopped (the vehicle speed detected by the vehicle speed sensor 101 is zero).

When determination at the step S2 is NO, the processing proceeds to "RETURN." On the other hand, when determination at the step S2 is YES, the processing proceeds to a step S3 to determine whether or not the predetermined brake hold control conditions are satisfied.

When determination at the step S3 is NO, the processing proceeds to a step S5. On the other hand, when determination at the step S3 is YES, the processing proceeds to a step S4 to execute the brake hold control by the brake hold control unit 100c. Thereafter, the processing proceeds to the step S5.

At the step S5, it is determined whether or not the predetermined neutral conditions are satisfied. When determination at the step S5 is NO, the processing proceeds to a step S7. On the other hand, when determination at the step S5 is YES, the processing proceeds to a step S6 to execute the neutral control by the neutral control unit 100b. Thereafter, the processing proceeds to the step S7.

At the step S7, it is determined whether or not the driver of the vehicle C steps on the accelerator pedal. When determination at the step S7 is YES, the processing proceeds to a step S8 to stop the control which is being executed. That is, in a case where the brake hold control unit 100c is executing the brake hold control, the brake hold control unit 100c stops such execution. In a case where the neutral control unit 100b is executing the neutral control, the neutral control unit 100b stops such execution. After the step S8, the processing proceeds to "RETURN."

When determination at the step S7 is NO, the processing proceeds to a step S9 to determine whether or not the predetermined switching condition is satisfied during execution of the brake hold control by the brake hold control unit 100c.

When determination at the step S9 is NO, the processing proceeds to "RETURN." On the other hand, when determination at the step S9 is YES, the processing proceeds to a step S10 to determine whether or not the neutral control is being executed.

When determination at the step S10 is NO, the processing proceeds to a step S12. On the other hand, when determination at the step S10 is YES, the processing proceeds to a step S11, and the neutral control unit 100b stops execution of the neutral control. Thereafter, the processing proceeds to the step S12.

At the step S12, the switching control unit 100d outputs the command to the electric parking brake control unit 100e to perform braking of the rear wheels 11b by the electric parking brake devices 16 (EPBs). Note that the electric motor 124 is stopped when the first set time is elapsed after the start of actuation of the electric motor 124.

At a subsequent step S13, it is determined whether or not the second predetermined time t2 has been elapsed after the start of actuation of the electric motor 124. When determination at the step S13 is NO, operation of the step S13 is repeated. On the other hand, when determination at the step S13 is YES, the processing proceeds to a step S14, and the switching control unit 100d stops execution of the brake hold control.

At a subsequent step S15, it is determined whether or not the driver steps on the accelerator pedal. When determination at the step S15 is NO, operation of the step S15 is repeated. On the other hand, when determination at the step S15 is YES, the processing proceeds to a step S16, and the electric parking brake control unit 100e cancels braking of the rear wheels 11b by the electric parking brake devices 16 (EPBs).

Next, operation of each hydraulic brake device 15, the first clutch 18, each electric parking brake device 16 (EPB) in a case where the predetermined neutral control conditions (described as "N CONDITIONS" in FIG. 8), the predetermined brake hold control conditions (described as "BH CONDITIONS" in FIG. 8), and the predetermined switching condition (described as "SW CONDITION" in FIG. 8) are satisfied during stop of the vehicle C will be described with reference to FIG. 8.

The driver steps on the brake pedal during travelling of the vehicle C, and in this manner, the braking force is provided to all of the vehicle wheels 11 by the hydraulic brake devices 15. Accordingly, the speed of the vehicle C decreases, and eventually reaches zero (the vehicle C is stopped). When the speed of the vehicle C reaches zero, the predetermined neutral control conditions are taken as satisfied. Execution of the neutral control by the neutral control unit 100b brings such a state that the oil pressure supplied to the hydraulic chamber of the first clutch 18 decreases and the multiple friction plates of the first clutch 18 are slipped on each other. When the speed of the vehicle C reaches zero, the brake pedal is stepped on, and the braking force is provided to all of the vehicle wheels 11.

In this state, it is assumed that the brake hold selection switch 108 is in an ON state. When the driver releases the brake pedal stepped during stop of the vehicle C, the predetermined brake hold control conditions are satisfied. Thus, even when stepping on the brake pedal is cancelled, the braking states of all of the vehicle wheels 11 by the hydraulic brake devices 15 are held by execution of the brake hold control by the brake hold control unit 100c.

When the first predetermined time t1 has elapsed after the start of execution of the brake hold control and the predetermined switching condition is satisfied, the switching control unit 100d switches application of the braking force to all of the vehicle wheels 11 by execution of the brake hold control by the brake hold control unit 100c to application of the braking force to the rear wheels 11b by the electric parking brake devices 16.

Specifically, when the predetermined switching condition is satisfied, the electric motor 124 for the electric parking brake devices 16 is actuated to move the spindle 127 toward the bottom portion 117a of the brake piston 117. When the first set time has elapsed after the start of actuation of the electric motor 124, the electric motor 124 is stopped. At this stage, both of the hydraulic brake device 15 and the electric parking brake device 16 put a brake on each rear wheel 11b.

When the second predetermined time t2 has elapsed after the start of actuation of the electric motor 124, execution of the brake hold control by the brake hold control unit 100c is stopped. Thus, from the point of time when the second predetermined time t2 has elapsed after the start of actuation of the electric motor 124, the oil pressure in the cylinder member 118 of the hydraulic brake device 15 gradually decreases, and eventually, a braking cancelled state is brought.

Upon switching by the switching control unit 100d, execution of the neutral control by the neutral control unit 100b is stopped. Specifically, execution of the neutral control is stopped at the substantially same time as the start of actuation of the electric motor 124. Accordingly, the oil pressure supplied to the first clutch 18 starts increasing at the substantially same time as the start of actuation of the electric motor 124, and the first clutch 18 is brought into the fully-engaged state before execution of the brake hold control is stopped.

Thus, in the present embodiment, the neutral control unit 100b stops execution of the neutral control upon switching by the switching control unit 100d. Thus, when the request for starting the vehicle C is made by the driver after switching (when the driver steps on the accelerator pedal), the first clutch 18 has been already brought into the fully-engaged state. Accordingly, when the request for starting the vehicle C is made by the driver after switching, only braking of the rear wheels 11b by the electric parking brake devices 16 may be cancelled.

When the request for stating the vehicle C is made by the driver after switching, if both of the operation of cancelling braking of the rear wheels 11b by the electric parking brake devices 16 and the operation of bringing the first clutch 18 into the fully-engaged state are performed to start the vehicle C, starting performance of the vehicle C might be lowered depending on which operation the completion timing is earlier or later and/or a time lag in the completion timing between both types of operation. For this reason, there is a high probability that a feeling of discomfort is provided to the driver of the vehicle C upon starting of the vehicle C.

However, in the present embodiment, the vehicle C can be, as described above, started only by the operation of cancelling braking of the rear wheels 11b by the electric parking brake devices 16, and therefore, lowering of the starting performance of the vehicle C due to overlapping of both types of operation can be suppressed. Thus, when the request for starting the vehicle C is made by the driver after switching by the switching control unit 100d, the feeling of discomfort on the driver of the vehicle C upon starting of the vehicle C can be reduced.

Moreover, in the present embodiment, execution of the brake hold control is stopped after the first clutch 18 has been brought into the fully-engaged state. Thus, lifting of a front side of the vehicle C can be reduced as much as possible. That is, when the first clutch 18 is brought into the fully-engaged state and great torque from the automatic transmission 2 acts on the front wheels 11a, a coil spring of a suspension of each front wheel 11a tends to be extended by such torque. Thus, the front side of the vehicle C receives lifting force from the coil springs. Due to such force, a coil spring of a suspension of each rear wheel 11b tends to be contracted, and as a result, the front side of the vehicle C is further lifted. When the torque acts on the front wheels 11a as described above, if no braking force is provided to the front wheels 11a, lifting of the front side of the vehicle C is noticeable. However, in the present embodiment, when the torque acts on the front wheels 11a, the braking force is provided to the front wheels 11a, and therefore, lifting of the front side of the vehicle C can be suppressed as much as possible. Thus, a state change such as lifting of the front side of the vehicle C can be reduced, and the feeling of discomfort on the driver due to such a state change can be reduced.

The present invention is not limited to the above-described embodiment, and substitutions can be made without departing from the gist of the claims.

For example, in the above-described embodiment, the electric parking brake device 16 is provided at each of the right and left rear wheels 11b. However, the electric parking brake devices 16 may be provided at all of the vehicle wheels 11 to provide the braking force to all of the vehicle wheels 11. Alternatively, the electric parking brake device 16 may be provided at each of the right and left front wheels 11a to provide the braking force to the front wheel 11a, or may be provided at the single front wheel 11a or the single rear wheel 11b to provide the braking force to the front wheel 11a or the rear wheel 11b.

Moreover, in the above-described embodiment, the vehicle C is the FF vehicle, but may be an FR vehicle. In this case, the vehicle wheels to which the braking force is provided upon execution of the brake hold control by the brake hold control unit 100c may be only the rear wheels 11b or all of the vehicle wheels 11.

The above-described embodiment has been set forth merely as an example, and the scope of the present invention shall not be interpreted in a limited manner. The scope of the present invention is defined by the claims, and variations and changes belonging to an equivalent scope of the claims are all included within the scope of the present invention.

INDUSTRIAL APPLICABILITY

The present invention is useful for a vehicle control device configured to execute neutral control and brake hold control.

DESCRIPTION OF REFERENCE CHARACTERS

C Vehicle
1 Engine (Drive Source)
2 Automatic Transmission
11 Vehicle Wheel
11a Front Wheel (Drive Wheel)
11b Rear Wheel
15 Hydraulic Brake Device
16 Electric Parking Brake Device
18 First Clutch (Frictional engagement element Engaged upon Forward Starting of Vehicle)
100 Control Unit (Control Device)
100b Neutral Control Unit
100c Brake Hold Control Unit
100d Switching Control Unit
124 Electric Motor (Electric Actuator)

The invention claimed is:

1. A vehicle control device for a vehicle including
a drive source,
an automatic transmission to which torque generated at the drive source is input, the automatic transmission having a frictional engagement element engaged upon starting of the vehicle,
a hydraulic brake device provided at each of all vehicle wheels of the vehicle and providing braking force to each vehicle wheel by fluid pressure, the vehicle wheels including a drive wheel to be driven by torque output from the automatic transmission, and
an electric parking brake device provided at each of at least some of all vehicle wheels and providing braking force to the at least some of the vehicle wheels by driving of an electric actuator, the vehicle control device comprising:
a neutral control unit executing, when a predetermined neutral control condition including a condition regarding a range position of a shift lever of the vehicle is satisfied during stop of the vehicle, neutral control of decreasing a degree of engagement of the frictional engagement element as compared to that in a fully-engaged state or bringing the frictional engagement element into a fully-disengaged state;
a brake hold control unit executing, when a predetermined brake hold control condition is satisfied during stop of the vehicle, brake hold control of providing braking force to at least the drive wheel by the hydraulic brake device of the drive wheel even if a driver of the vehicle does not step on a brake pedal; and
a switching control unit switching, when a predetermined switching condition is satisfied during execution of the brake hold control by the brake hold control unit, application of the braking force to at least the drive wheel by execution of the brake hold control to application of the braking force to the at least some of the vehicle wheels by the electric parking brake device,
wherein when the predetermined switching condition is satisfied during execution of the brake hold control by the brake hold control unit, if the neutral control is being executed, the neutral control unit is configured to stop execution of the neutral control upon switching by the switching control unit.

2. The vehicle control device according to claim 1, wherein
the switching control unit is configured to start actuation of the electric actuator when the predetermined switching condition is satisfied during execution of the brake hold control by the brake hold control unit, and causes the brake hold control unit to stop execution of the brake hold control when a predetermined time is elapsed after the start of actuation of the electric actuator, and
the neutral control unit is configured to stop execution of the neutral control such that the frictional engagement element is brought into the fully-engaged state before execution of the brake hold control is stopped if the neutral control is being executed when the predetermined switching condition is satisfied during execution of the brake hold control by the brake hold control unit.

3. The vehicle control device according to claim 2, wherein
the brake hold control unit is configured to hold a stop state of the vehicle by the hydraulic brake devices of all vehicle wheels of the vehicle, and
the electric parking brake device is provided at each of the some vehicle wheels of the vehicle to provide the braking force to the some vehicle wheels.

4. The vehicle control device according to claim 3, wherein
the drive wheel is a front wheel, and
the electric parking brake device is provided at each of right and left rear wheels of the vehicle to provide the braking force to the each of the right and left rear wheels.

* * * * *